United States Patent
Kujawski et al.

(10) Patent No.: US 6,948,670 B2
(45) Date of Patent: Sep. 27, 2005

(54) FOOD PROCESSOR WITH REMOVABLE BLADE CARTRIDGE

(75) Inventors: Stanley M. Kujawski, East Aurora, NY (US); Eric J. Wangler, 4447 Freeman Rd., Orchard Park, NY (US) 14127; Bradley Caldwell, Westport, NY (US)

(73) Assignees: Eric J. Wangler, Mendon, NY (US); Mary P. Crowley-Wangler, Mendon, NY (US)

( * ) Notice: Subject to any disclaimer, the term of this patent is extended or adjusted under 35 U.S.C. 154(b) by 0 days.

(21) Appl. No.: 10/706,781

(22) Filed: Nov. 12, 2003

(65) Prior Publication Data

US 2004/0094645 A1 May 20, 2004

Related U.S. Application Data

(60) Provisional application No. 60/426,300, filed on Nov. 14, 2002.

(51) Int. Cl.$^7$ .............................................. A47J 43/00
(52) U.S. Cl. .................. 241/169; 241/285.1; 452/146; 452/147
(58) Field of Search ................................ 241/168, 169, 241/169.1, 169.2, 285.1; D7/393; 452/141, 146, 147

(56) References Cited

U.S. PATENT DOCUMENTS

| | | | |
|---|---|---|---|
| 2,253,123 A | | 8/1941 | Hart |
| 3,611,476 A | | 10/1971 | Clifton |
| 3,661,072 A | | 5/1972 | Allinquant et al. |
| 3,869,755 A | | 3/1975 | Stauft |
| 3,900,918 A | | 8/1975 | Allinquant et al. |
| 4,169,300 A | * | 10/1979 | McCullough ............... 452/141 |
| 4,199,841 A | | 4/1980 | Jaccard |
| 4,462,139 A | * | 7/1984 | Hubbard et al. ............ 452/143 |
| 4,463,476 A | | 8/1984 | Jaccard |
| 4,865,258 A | * | 9/1989 | Smith et al. ............. 241/169.1 |
| 4,870,717 A | | 10/1989 | Hirano |
| 5,085,614 A | | 2/1992 | Bourret |
| 5,336,125 A | * | 8/1994 | Despointes ................. 452/127 |
| 6,120,368 A | | 9/2000 | Ter-Minassian |
| 6,601,499 B1 | * | 8/2003 | Bifulco ........................ 100/73 |

FOREIGN PATENT DOCUMENTS

| | | |
|---|---|---|
| CA | 2077730 | 3/1993 |
| DE | 197 37 085 A 1 | 3/1999 |
| EP | 0 534 516 A1 | 3/1993 |

* cited by examiner

Primary Examiner—Mark Rosenbaum
(74) Attorney, Agent, or Firm—John C. McMahon

(57) ABSTRACT

A cartridge for a hand operated food processor including a blade holder holding at least one blade. A quick release lock is provided for retaining the cartridge in a casing. The cartridge preferably includes at least one series of aligned blades held by the blade holder utilizable for piercing and cutting food. The invention further includes a food processor having a housing including the above cartridge and a casing holding the cartridge. The invention also includes a food processor having a housing that has at least one blade and preferably at least one longitudinal series of blades for piercing and cutting food where each of the blades has side surface portions and a cutting tip edge portion. A base is provided with openings through which the blades can pass to pierce and cut food. The base includes a fixed base portion and a removable base portion. The removable base portion is provided with a sufficient number of longitudinal slots, open at one end of the slots, so that the slots in the removable base portion can be placed over the side surface portions of the blades without encountering the cutting tip edge portions of the blades. The removable base portion can be easily secured to the fixed base portion and easily removed from the fixed base portion utilizing a quick release latch mechanism. The fixed base portion is secured to the housing by a retracting mechanism that permits retraction of the base relative to the housing so that upon retraction the blades extend through the slots to process food in contact with the bottom of the base.

15 Claims, 7 Drawing Sheets

FOOD PROCESSOR WITH REMOVABLE BLADE CARTRIDGE

BACKGROUND OF THE INVENTION

This invention relates to food processors and more particularly relates to manual type food processors where blades are downwardly forced onto food product to cut it, chop it or tenderize it. The invention especially relates to mechanical meat tenderizers where a plurality of knives are inserted into meat product to cut tough fibrous material to make the meat easier to chew.

Numerous food processors are known where blades are manually forced downwardly onto food product to cut, chop or tenderize it. For example, meat tenderizer apparatuses are known that have a plurality of knives that are forced into the meat as described in U.S. Pat. No. 4,199,841 and U.S. Pat. No. 4,870,717. Such tenderizer apparatuses have a significant disadvantage in that it is very difficult to thoroughly clean them and it is very difficult to replace the blades. Certainly replacement of the blades is sufficiently inconvenient that blades of different configurations for different functions could not routinely be changed during use of the apparatus. A review of U.S. Pat. No. 4,199,841 for example shows that to remove blades, screws 23 and 25 must be removed, members 19 and 21 must be separated, blades 35 and spacers 31 and 32 must be disassembled, blades 35 must be pulled from plate 13, new blades 35 must then reinserted into plate 13 and then reassembled with spacers 31 and 32 and members 19 and 21 and screws 23 and 25 must be replaced. As a further concern during blade replacement, care must be taken to avoid accidental disassembly of springs 59, tubes 61 and plungers 65, or much more effort and at least some skill will be required for their reassembly. It should be further noted that reinsertion of blades 35 into plate 13 is no simple task since the blades readily become misaligned and thus do not easily fit back into slots 57. This is further aggravated by the fact that points on blades 35 readily catch on the sides of slots 57 thus making reassembly by inserting pointed ends of the blades into the slots impracticably difficult. Insertion of the blades into the slots 57 must thus be done from the ends of the blades opposite the points prior to reassembly with spacers 31 and 32 and members 19 and 21.

Disassembly for cleaning and reassembly after cleaning is similarly difficult.

As a further disadvantage, the complex assembly structure of the apparatus described in U.S. Pat. No. 4,199,841, make initial assembly for new products difficult thus adding significant cost to the product.

Cleaning and replacement of blades in the apparatus of U.S. Pat. No. 4,870,717 is no better. In this case a single cartridge unit 12 is used that has a plate holder 14 and a cutter plate 13 with integral cutting blades 15. Multiple units 12 are used if a plurality of parallel blades series are desired. To remove the blades, screws 23, 24 and 28 must be removed, followed by separation of cover case member 22 into two halves 22a and 22b giving access to side case members 21 which must be separated to give access to cartridge units 12. The separation of side members 21 almost automatically results in at least partial disassembly of post members 17 from spring members 18, guide pins 39 and case member 22 which creates a serious reassembly problem. Replacement of blades may be accomplished by inverting the steps as described above with respect to disassembly; however, reversal of the steps is more difficult. In particular, it is very difficult to retain all parts in their proper positions while the case halves 22a and 22b are reassembled. Adding to the difficulty is the fact that the blades are difficult to simultaneously place in the slits 35 do to a high probability of misalignment and points of the blades tend to catch in slits 35 in a manner similar to that described with respect to U.S. Pat. No. 4,199,841 above. Tapering of the slits near their tops in fact does not help as the points of the blades are even more likely to become stuck on the more horizontally oriented tapered surfaces. The use of the cartridge having plate holder 14 causes a further problem in that it is not even possible to insert the blades from an end opposite the blade points, i.e. the plate holder 14 cannot be inserted through the slits 35 that are narrower than the plate holder.

BRIEF DESCRIPTION OF THE INVENTION

In accordance with the invention, a cartridge for a hand operated food processor is provided that includes a blade holder having at least one blade holder demi-lock for cooperating with a mating casing demi-lock on a casing to together form a quick-release lock for retaining the cartridge in the casing. The cartridge including at least one blade and preferably at least one series of aligned blades held by the blade holder utilizable for piercing and cutting food.

The quick release lock is preferably at least one recess in the blade holder (blade holder demi-lock) for receiving a spring biased latch projection from a casing (casing demi-lock) for retaining the cartridge in the casing.

"Demi-lock" as used herein means one-half of a locking structure that can cooperate with another half of a locking structure to form a lock. Example of demi-locks include recesses for receiving locking bolts, locking bolts for entering recesses, cam surfaces for locking with cams and cams for locking with cam surfaces, etc.

The invention further includes a food processor having a housing including the above cartridge and a casing holding the cartridge. A quick release lock is provided for locking the cartridge into the casing. In a preferred embodiment, the quick release lock is at least one spring biased latch projection or bolt connected to the casing that protrudes into a recess in the blade holder of the cartridge to securely retain the cartridge in the casing. The cartridge is easily removable from the casing by moving the projection against the spring bias out of the recess to release retention of the cartridge within the casing. It is to be understood that other quick release type locks can be used, e.g. a bolt that is not spring biased into a recess or other bolt retainer but is manually moved into a recess or other bolt retainer and locked there. Such quick release locks for retaining the cartridge in the casing make the cartridge easy to replace and make the food processor easy to clean.

The invention also includes a food processor having a housing that has at least one blade and preferably at least one series of longitudinally aligned blades for piercing and cutting food where each of the blades has side surface portions and a cutting tip edge portion. A base is provided with openings through which the blades can pass to pierce and cut food. The base includes a fixed base portion and a removable base portion. The removable base portion is provided with a sufficient number of longitudinal slots, open at one end of the slots, so that the slots in the removable base portion can be placed over the side surface portions of the blades without encountering the cutting tip edge portions of the blades. The removable base portion can be easily secured to the fixed base portion and easily removed from the fixed base portion utilizing a quick release latch mechanism for ease in cleaning and replacement.

The fixed base portion is secured to the housing by a retracting mechanism that permits retraction of the base relative to the housing so that upon retraction, the blades extend through the slots and beyond the base to pierce and cut food in contact with the base. Preferably, the slots in the removable base portion widen proximate the open end of the slots to assist in guiding the blades into the slots and the retracting mechanism securing the housing to the fixed base portion includes a pair of tubes at opposing ends of the fixed base portions that fit into retaining cavities in the housing and housing springs within the housing that outwardly bias the tubes so that points of the blades are within the slots and do not extend beyond the base and so that a force applied to drive the housing toward the base causes compression of the housing springs permitting the tubes to further enter the housing thus reducing distance between the housing and the base thus causing the blades to extend through the slots and beyond the base to pierce and cut food in contact with the base.

DETAILED DESCRIPTION OF THE INVENTION

Figure 1:
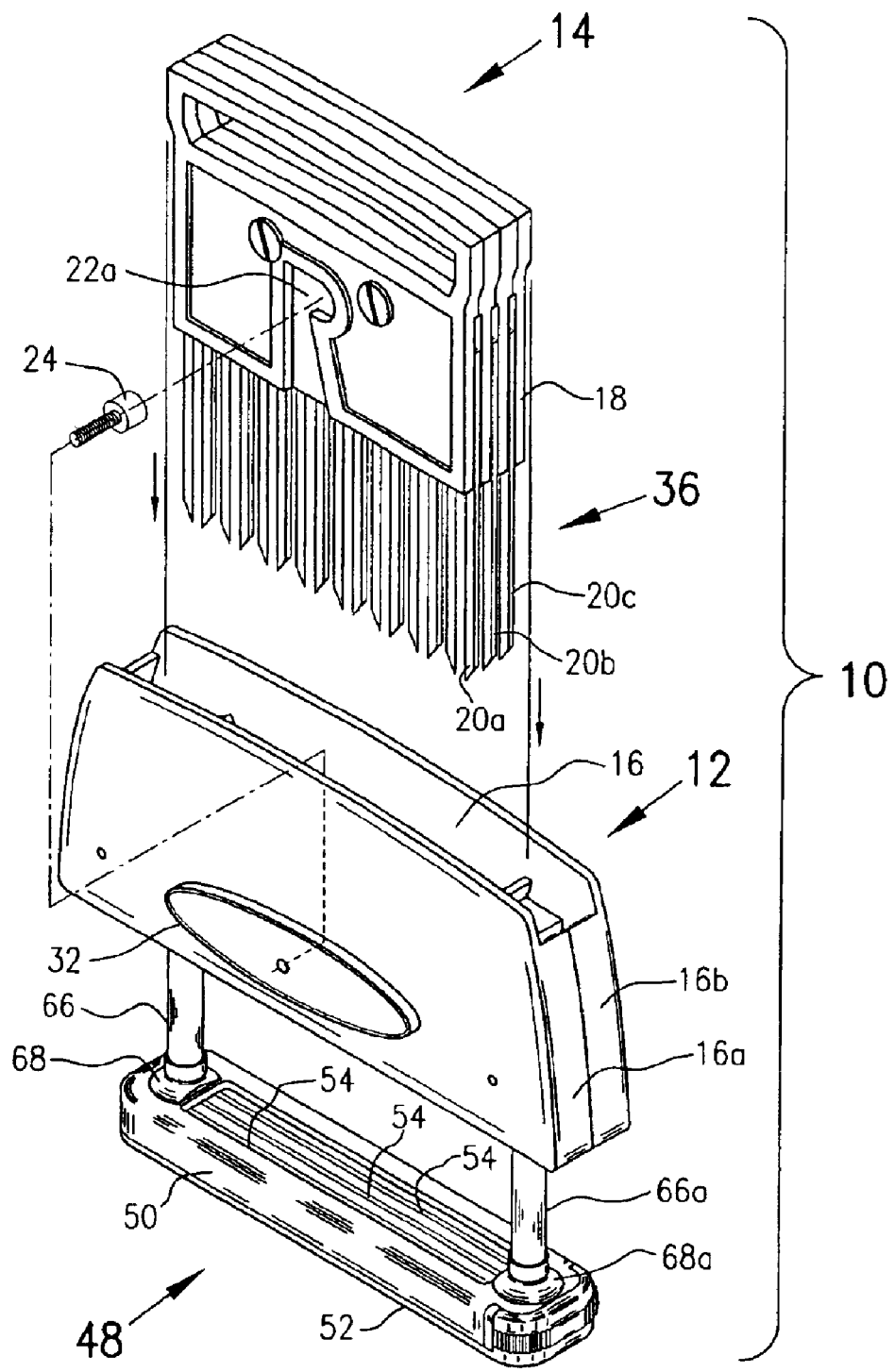
FIG. 1 shows a front side perspective view of a preferred embodiment of a food processor with a removable blade cartridge in accordance with the invention.

An important aspect of one embodiment of the present invention is that a cartridge, containing a series of knife blades, is provided for a hand operated food processor that is easily removed from and replaced into a food processor thus permitting easy cleaning and blade replacement. The food processor is most commonly a meat tenderizer that causes a series of blades to enter into meat and cut meat fibers when downward pressure is applied to the food processor as its base or foot sits on meat to be processed. The cartridge includes a blade holder having at least one demi-lock for cooperating with a demi-lock on a casing for the cartridge to form a quick release lock that holds the cartridge in the casing. In a preferred embodiment, the quick release lock includes a recess in a blade holder of the cartridge for receiving a spring biased latch projection from the casing for retaining the cartridge in the casing.

In addition to the blade holder, the cartridge includes at least one blade and preferably and at least one series of aligned blades held by the blade holder utilizable for piercing and cutting food. Piercing can be used for any operation where piercing may be desirable, e.g. for holding food as may have previously been done with a fork or for forcing flavorants or other additives into meat product by injection or by carrying material from the surface of the meat product into the meat. Cutting is also intended to include essentially any operation involving cutting, e.g. slicing, chopping, dicing, and fiber cutting as in meat tenderizing. For meat tenderizing applications, the blades are usually about one mm thick and two mm wide but may vary significantly, e.g. from about 0.5 mm to 1.5 mm in thickness and 1 to about 4 mm in width for meat tenderizing applications and from about 0.5 mm to about 2 mm in thickness and from about 0.5 mm to as much as 10 cm in width for other applications, e.g. sticking for inclusion of flavorants or slicing for making of meat or other food strips or for chopping food. The blades are usually made of stainless steel but may be made of other materials, e.g. high carbon steel, hard high density plastic, fiber glass, or completely or partially of metal carbides. The blades are usually formed from a plate material of the thickness desired for the blades by cutting the blades from the plate material. Commonly, when the blades are cut from the plate material, a portion of the plate opposite points on the blades is undisturbed to form an integral blade retaining strip that retains an aligned series of blades cut from the plate. The number of blades in a series cut from the plate can vary significantly , e.g. from less than about five to more than ten, and are commonly from about 15 to about 20. A plurality of spaced cut parallel plates can be included in a blade holder to obtain a plurality, e.g. three, parallel series of aligned blades.

The blade holder usually is designed to hold one or more blade retaining strips, e.g. one, two or three strips, which in turn holds the aligned blades. The blade retaining strips, or both the blade retaining strips and tops of the blades may be assembled into the blade holder, e.g. with retaining bolts or may be embedded into the blade holder, e.g. by casting or injection molding. When more than one series of blades is used, spacers are used between them than are usually from about 3 to about 10 times the thickness of the blades.

The blade holder is usually a formed or machined plastic material but may also be machined or formed metal or ceramic. The cartridge is preferably provided with at least two mirror image recesses so that the cartridge can be inserted and locked into the casing in a plurality of orientations, especially in dual orientations 180 degrees rotated about a vertical axis defined by the direction of insertion of the cartridge. Such a structure permits the cartridge to be inserted without checking as to orientation.

The invention includes the food processor, as previously discussed, having a housing including the above described cartridge and a casing holding the cartridge. The casing preferably has at least one spring biased latch projection that protrudes into a recess in the blade holder of the cartridge to securely retain the cartridge in the casing and the cartridge is easily removable from the casing by moving the projection against the spring bias out of the recess to release retention of the cartridge within the casing. The spring biased latch projection may be any suitable spring biased latch projection. The projection may for example include tabs, bolts, pins or rods biased by any suitable spring mechanism such as leaf, elastic or coil springs made of plastic or metal material having deformation, compression or elastic memory. The spring biased latch projection may for example be a projection biased into the recess in the cartridge by the spring effect of plastic memory of the tab or a projection movable in a groove in the casing and a projection spring biasing the projection toward an end of the groove into the recess in the cartridge. In such a case the latch projection may be secured through the groove to a control button so that movement of the control button toward the spring moves the latch projection out of the recess to release the cartridge from the casing. It is to be understood that many other quick release locks may be used for holding the cartridge in the casing including, but not limited to, cams and cam surfaces, latch bolts and recesses, through pins and pin retainers, etc.

In a further embodiment, the food processor may include a housing having at least one longitudinal series of blades for piercing and cutting food, each of the blades having side surface portions and a cutting tip edge portion and a base provided with openings or slots through which the blades can pass to pierce and cut food. In this embodiment, the base importantly has a fixed base portion and a removable base portion where the removable base portion is provided with a sufficient number of longitudinal slots open at one end of the slots so that the slots in the removable base portion can be placed over the side surface portions of the blades without encountering the cutting tip edge portions of the blades. Preferably, the slots widen proximate the open end of the slots to assist in guiding the blades into the slots without encountering the cutting tip edge portions of the blades.

The removable base portion can be easily removed from or attached to the fixed base portion. Structure for securing the removable base portion to the fixed base portion may include orienting structures, e.g. mating projections and grooves such as matching grooves and flanges on the fixed base portion and removable base portion such that the removable base portion can simply be slid into the fixed base portion. The removable base portion can be retained in the fixed base portion by any suitable locking mechanism, e.g. a latch projection on the fixed base portion that fits into a detent in the removable base portion. It is of course envisioned that the latch projection may alternatively be on the removable base portion and the detent may be on the fixed base portion. Other structures can also be used for securing the removable base portion to the fixed base portion, e.g. spring biased pins, quick release bolts, etc., with or without a groove and flange slide or other orienting structure.

The base of the food processor is secured to the housing by a retractable structure that permits the base portion to be forced toward the housing but provides stability in all other directions. In the case of the embodiment where the base includes a fixed base portion and a removable base portion, the retractable structure is connected between the fixed base portion and the housing. The retractable structure, as previously discussed, permits movement of the base portion of the food processor toward the housing of the food processor such that upon retraction the blades extend through the slots and beyond the base to pierce and cut food in contact with the base. The retractable structure may, for example, include outwardly bendable leaf springs or axially compressable coil springs permitting the base to be moved toward the housing but biasing the base and housing away from each other.

The structure for securing the base to the fixed base portion of the housing preferably includes a pair of tubes at opposing ends of the fixed base portions that fit into retaining cavities in the housing and housing springs within the housing that outwardly bias the tubes so that points of the blades are within the slots of the base and do not extend beyond the base and so that a force applied to drive the housing toward the base causes compression of the housing springs permitting the tubes to further enter the housing thus reducing distance between the housing and the base thus causing the blades to extend through the slots and beyond the base to pierce and cut food in contact with the base.

Figure 2:
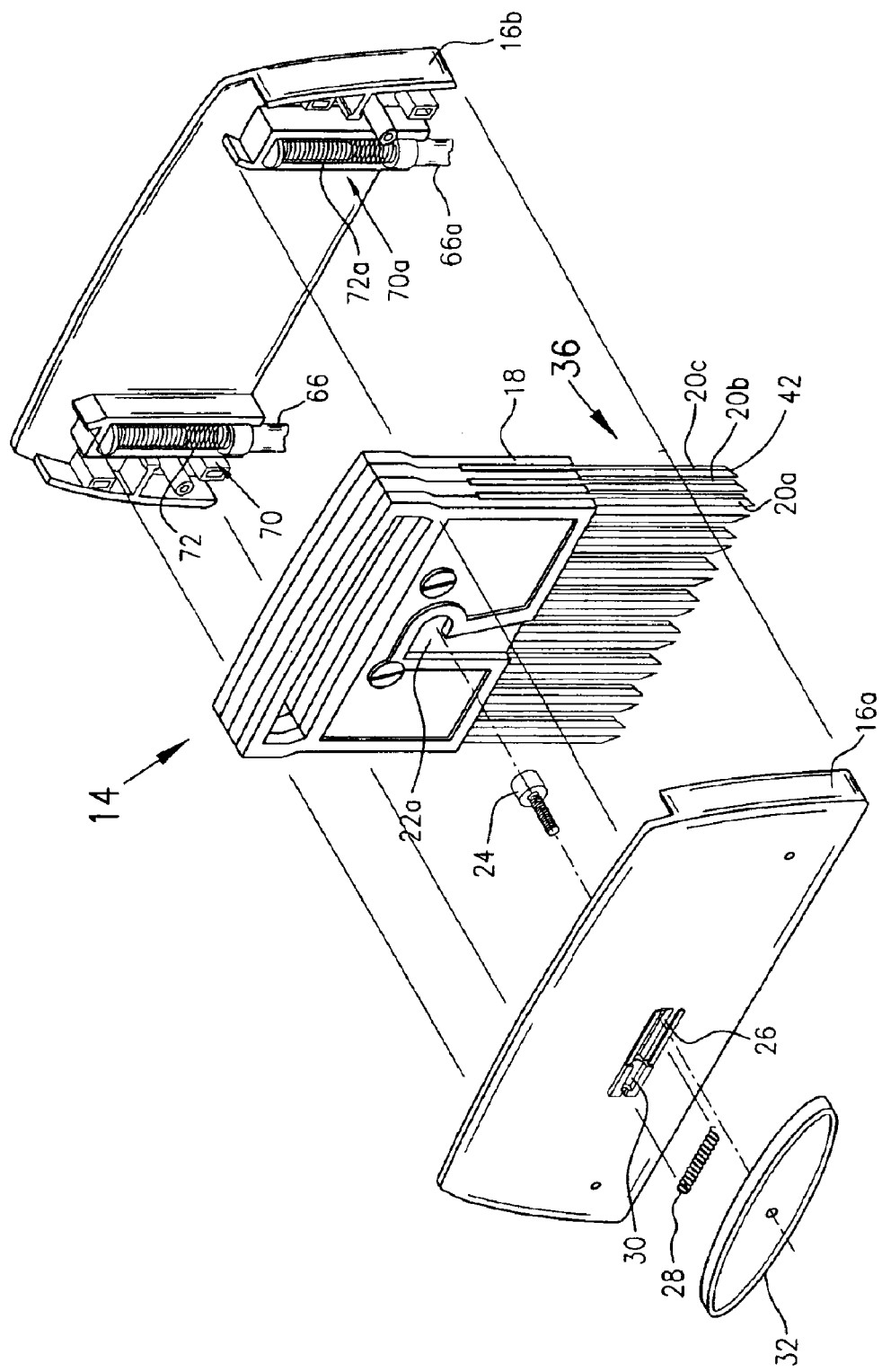
FIG. 2 shows an exploded view of the casing and cartridge of the food processor of FIG. 1 from a front side-end perspective.
Figure 3:
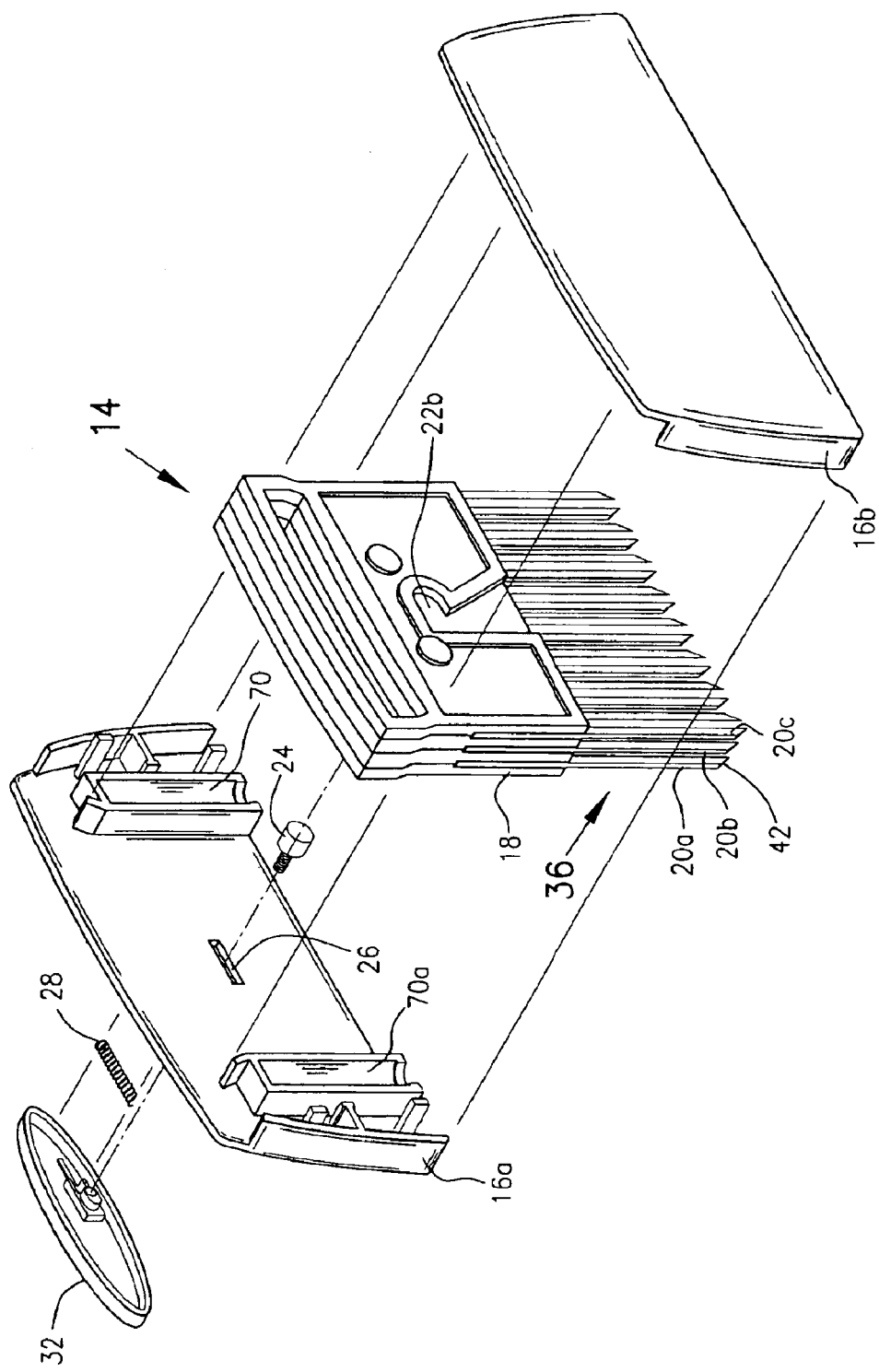
FIG. 3 shows an exploded view of the casing and cartridge of the food processor of FIG. 1 from a rear side-end perspective.
Figure 8:
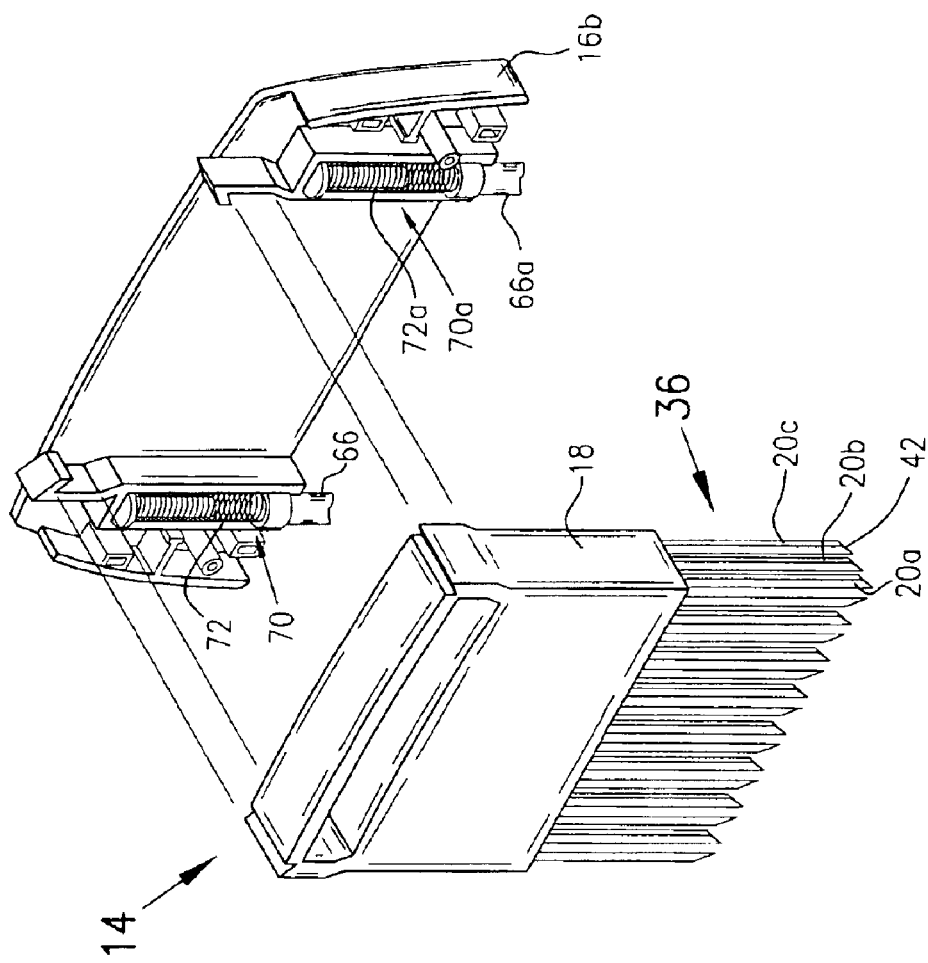
FIG. 8 shows an alternative embodiment of the food processor of the invention where the spring biased latch projections include plastic tabs that are held into recesses in the cartridge by resilience of the plastic.
Figure 7:
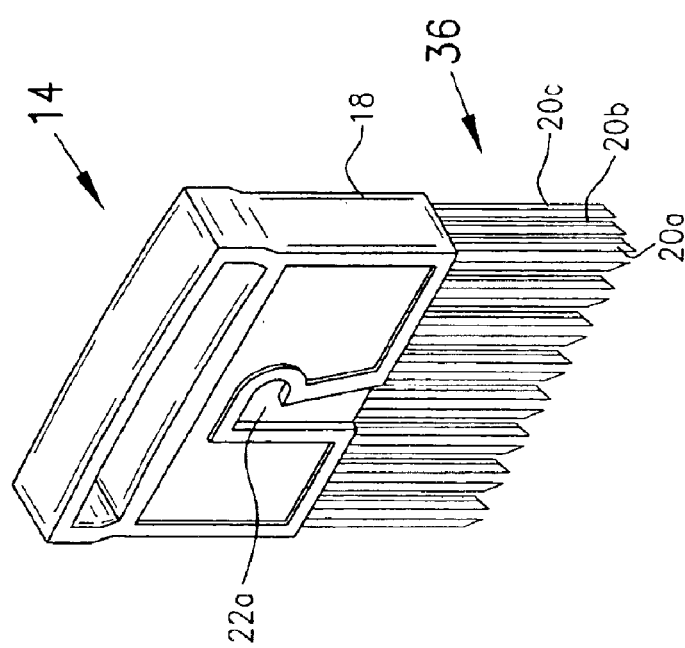
FIG. 7 shows a view of a second preferred embodiment of a cartridge of the invention with blades embedded in a formed blade holder.

Referring now to the drawings, as best seen in FIG. 1, a preferred embodiment of the food processor 10 of the invention includes a housing 12 in turn having a cartridge 14 and a casing 16 holding cartridge 14. The casing 16 is made of assembled casing halves 16a and 16b. The cartridge 14 has a blade holder 18 that holds blades 36 preferably in three series of blades 20a, 20b and 20c. Blade holder 18 is also provided with mirror image latch recesses 22a and 22b for receiving a spring biased latch projection 24 from casing 16 to hold blade holder 18 within casing 16. In the embodiment shown in FIGS. 2 and 3, spring biased latch projection 24 is movable in groove 26 and is biased to one end of groove 26 by coil spring 28 held in spring detent 30 on casing half 16a so that projection 24 is pushed by spring 28 into one of latch recesses 22a and 22b. Cartridge 14 is easily removed from casing 16 by moving the button 32 attached to projection 24 in a direction that compresses spring 28 thus causing projection 24 to be freed from a recess 22a or 22b. In an alternative embodiment shown in FIG. 8, the spring biased latch projections are plastic tabs 34 held in recesses 22c and 22d of the cartridge 14a by resilience of the tabs 34 due to plastic memory.

Figure 6:
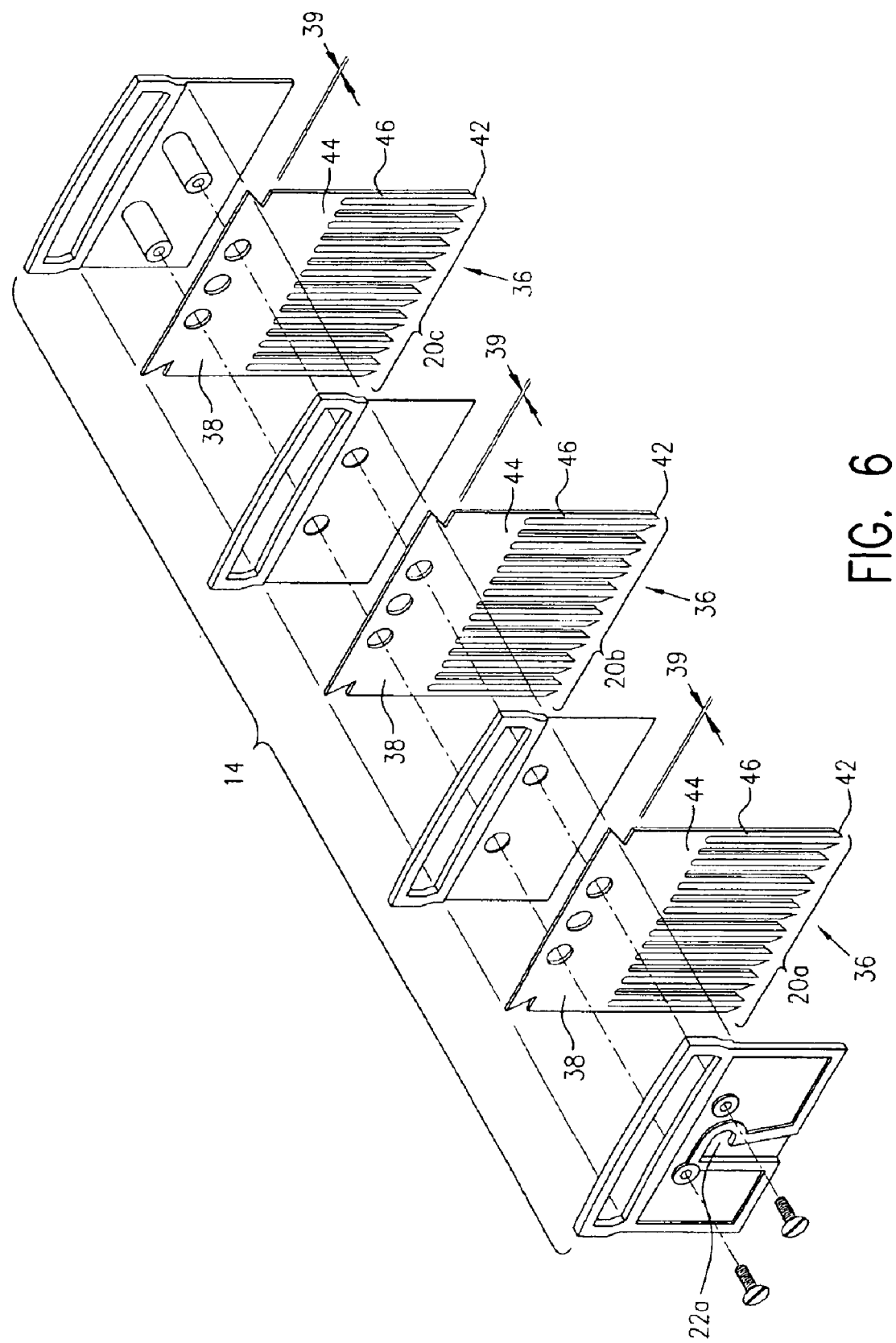
FIG. 6 shows an exploded view of embodiment of the cartridge of FIG. 6.

The blades 36 in the cartridge, as best seen in FIG. 6, may be formed in series 20a, 20b and 20c from a steel, preferably stainless steel, plate material 38 of the blade thickness 39 desired, such that a connecting retaining strip 40 is retained that holds the blades in the series in aligned relationship. Each of the blades thus has a free cutting tip edge portion 42, an opposing retaining strip attached portion 44 and a side surface portion 46.

Figure 4:
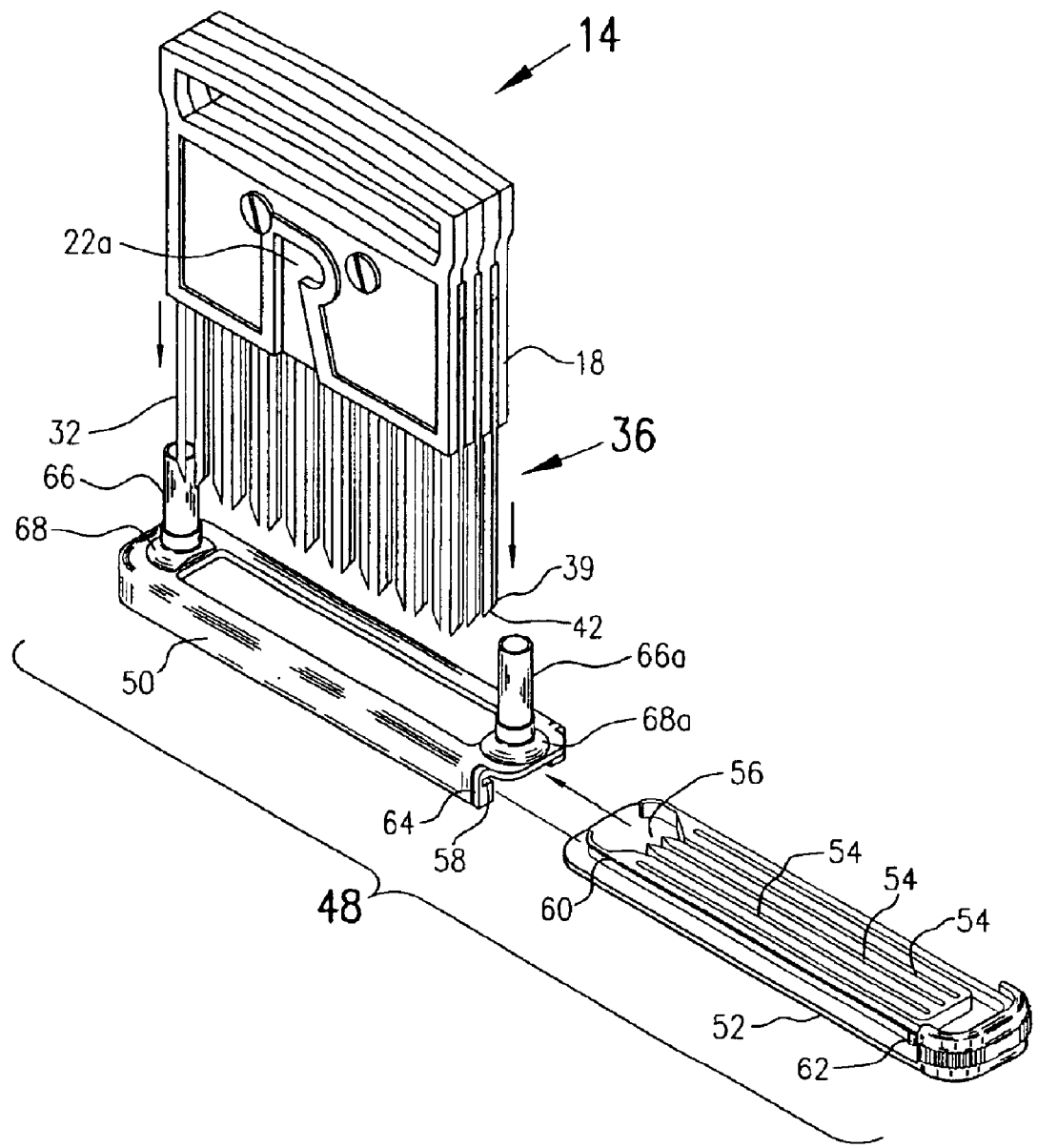
FIG. 4 shows a removable base portion in position to commence assembly with a fixed base portion in accordance with a preferred embodiment of the invention.
Figure 5:
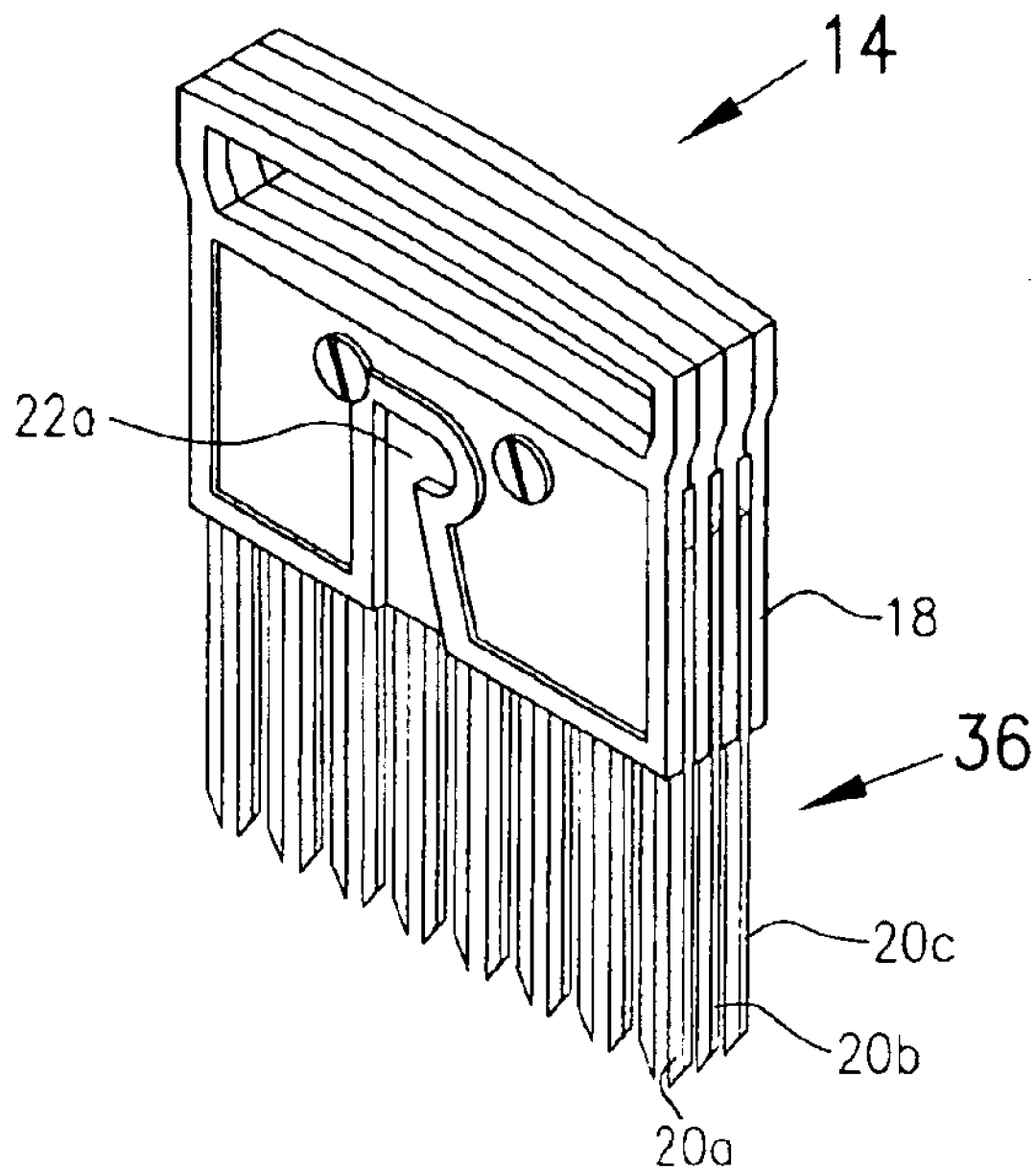
FIG. 5 shows a perspective view of a first preferred embodiment of a cartridge of the invention where the blades are assembled in the blade holder of the cartridge.

As best seen in FIG. 4, a food processor base 48 is provided that preferably has a fixed base portion 50 and a removable base portion 52. The base 48 is provided with openings 54 through which blades 36 can pass to pierce and cut food. The openings 54 are preferably in the form of slots in removable base portion 52 open at one end 56 of the slots so that the slots in the removable base portion can be placed over the side surfaces 39 of blades 36 without encountering cutting tip edge portions 42. The slots 54 preferably gradually widen near slot open ends 56 to assist in guiding the blades into the slots.

Structure is provided for securing the removable base portion 52 to fixed base portion 50, preferably in the form of a pair of longitudinal grooves 58 in the fixed base portion and mating longitudinal flanges 60 in the removable base portion so that the flanges 60 can be slid into the grooves 58 at the time that the slots 54 in the removable base portion are placed over the side surface portions 39 of the blades 36. The flanges 60 are removably retained within the grooves 58 by at least one detent 62 in a flange 60 that mates and latches with a latch protrusion 64 in the fixed base portion 50.

The housing 12 is connected to base 48 by any suitable structure that permits retraction of the base 50 relative to the housing 12, e.g. spring biased tubular structures or bowed leaf springs. The fixed base portion 50 is preferably secured to the housing 12 by a pair of tubes 66 and 66a at opposing ends 68 and 68a of the fixed base portion 50. Tubes 66 and 66a directly or through intermediate structure fit into retaining cavities 70 and 70a in the housing 12. Housing springs 72 and 72a within the housing 12 outwardly bias the tubes 66 and 66a so that points 42 of the blades 36 are within the slots 54 and do not extend beyond the base and so that a force applied to drive the housing 12 toward the base 48 causes compression of the housing springs 72 and 72*a* permitting the tubes to further enter the housing 12 thus reducing distance between the housing 12 and the base 48 thus causing the blades 36 to extend through the slots 54 and beyond the base 48 to pierce and cut food in contact with the base.

The food processor of the invention may be used for multiple purposes depending upon the configuration of blades 36. The food processor may, for example, be a food chopper, a food cutter, a food puncturer or a meat tenderizer.

What is claimed is:

1. A cartridge for a hand operated food processor comprising a blade holder having at least one blade holder demi-lock adapted to cooperate with a mating casing demi-lock on a casing so that when joined together form a quick-release lock for retaining the cartridge in the casing, said cartridge including at least one blade held by the blade holder utilizable for piercing and cutting food.

2. The cartridge of claim 1 wherein the blade holder holds at least one series of aligned blades.

3. The cartridge of claim 1 where the blade holder demi-lock is a recess in the blade holder for receiving the casing demi-lock that is in the form of a spring biased latch projection.

4. The cartridge of claim 1 wherein the blade holder includes two demi-locks in the form of cam surfaces adapted to mate with two casing demi-locks in the form of locking cams that operate against the cam surfaces to lock the cartridge in the casing.

5. The cartridge of claim 1 wherein the cartridge has three parallel series of aligned blades.

6. The cartridge of claim 2 wherein the number of blades in each series is at least ten, each of which has a width of from about 1 to about 4 mm and the cartridge is for a meat tenderizer.

7. The cartridge of claim 2 wherein the number of blades in each series is less than five, each of which has a width of from about 1 to about 4 cm and the cartridge is for a food chopper.

8. The cartridge of claim 3 wherein the cartridge is provided with at least two mirror image recesses so that the cartridge is adapted to be inserted and locked into the casing in a plurality of orientations.

9. A food processor having a housing comprising the cartridge of claim 1 and a casing holding the cartridge, said casing having at least one blade holder demi-lock to cooperate with said cartridge demi-lock to together form a quick release lock that securely retains the cartridge in the casing, said cartridge being easily removable from the casing by releasing the quick release lock.

10. The food processor of claim 9 wherein the quick release lock comprises at least one spring biased latch projection that protrudes into a recess in the blade holder of the cartridge and the cartridge is released by moving the projection against the spring bias out of the recess to release retention of the cartridge within the casing.

11. The food processor of claim 10 wherein the spring biased latch projection is a plastic tab on the casing having a projection biased into the recess in the cartridge by the spring effect of plastic memory of the tab.

12. The food processor of claim 10 wherein the spring biased latch projection comprises a projection movable in a groove in the casing and a projection spring biasing the projection toward an end of the groove into the recess in the cartridge.

13. The food processor of claim 12 wherein the latch projection is secured through the groove to a control button so that movement of the control button toward the spring moves the latch projection out of the recess to release the cartridge from the casing.

14. The food processor of claim 10 where the food processor is a meat tenderizer.

15. The food processor of claim 10 where the food processor is a food chopper.

* * * * *